INVENTOR.
NATHAN C. PRICE
BY
George C. Sullivan
Agent

INVENTOR.
NATHAN C. PRICE
BY
George Sullivan
Agent

March 15, 1966 N. C. PRICE 3,240,016

TURBO-JET POWERPLANT

Original Filed March 16, 1960 4 Sheets-Sheet 3

INVENTOR.
NATHAN C. PRICE

BY George C. Sullivan
Agent

March 15, 1966 N. C. PRICE 3,240,016

TURBO-JET POWERPLANT

Original Filed March 16, 1960

4 Sheets-Sheet 4

INVENTOR.
NATHAN C. PRICE

BY George A. Sullivan
Agent 3,240,016

TURBO-JET POWERPLANT

Nathan C. Price, Westwood, Calif.
(78 Ramblas de Los Capuchinos, Barcelona, Spain)

Original application Mar. 16, 1960, Ser. No. 15,088. Divided and this application May 7, 1964, Ser. No. 375,408

5 Claims. (Cl. 60—39.36)

This application is a division of my copending application, Serial Number 15,088, filed March 16, 1960, entitled "Turbo-Jet Powerplant," and now United States Letters Patent 3,203,180, dated August 31, 1965.

This invention relates to a turbo-jet powerplant, and more particularly to a small and compact turbo-jet powerplant unit.

Present day turbo-jet powerplants comprise highly developed and intricate mechanisms of substantially large size to handle a sufficiently large fluid mass flow to accomplish thrust; the large mass flow being required because of the operating temperature limitations on the hot parts or turbine structure of the power plant. To accomplish an acceptable as well as reasonable level of propulsive thrust, the temperature of a relatively large mass of air is elevated a relatively small amount to keep within the operating temperature limits, thus necessitating a relatively large piece of machinery of inherently substantial weight and structure due to such things as a plurality of heavy duty bearings and associated lubrication systems, etc. Complexity, as well as resulting weight and size, of these propulsion units rises on a logarithmic scale as refinements and developments occur to increase the net thrust. Beyond a certain point the law of diminishing returns applies in that further growth or refinement results in greater weight and size increases in the powerplant unit than the equivalent thrust increase under the thrust/weight ratio of the powerplant unit existing theretofore. It has been known in the prior art that the greatest thrust/weight ratio in turbo-jet powerplants is with the smaller units, and by using a cluster of small units an overall greater thrust/weight ratio can be accomplished than with one large unit.

Accordingly, it is an object of this invention to provide a light weight and compact turbo-jet powerplant comprising a combination of compatible, unique and novel features to accomplish a small and compact structure operable at relatively high combustion temperatures for a high thrust/weight ratio.

A further object of this invention is to provide a light weight and compact turbo-jet powerplant construction wherein all cooling and lubrication is accomplished by use of air and fuel only, thereby eliminating an oil lubricating system.

Another object of this invention is to provide a light weight and compact turbo-jet powerplant having a minimum of stator and nozzle stages in the compressor and turbine sections whereby the stator and nozzle stages intermediate adjacent compressor and turbine rotor stages are eliminated while still handling the airflow therethrough in a most efficient manner.

It is still another object of this invention to provide a light weight and compact turbo-jet powerplant with a toroidal vortex combustion arrangement of relatively small volume, yet efficiently handling combustion of the large mass flow of air at the relatively high combustion temperatures.

A still further object of this invention is to provide a light weight and compact turbo-jet powerplant with blading arrangements for a high compression ratio, which when combined with the relatively high combustion temperatures results in a relatively large thrust/weight ratio.

Another object of this invention is to provide a light weight and compact turbo-jet powerplant with a relatively large thrust/weight ratio of relatively few and simple parts capable of easy and quick assembly, disassembly and servicing.

Other objects and advantages will become apparent from the following description taken in connection with the accompanying drawings in which.

Figures 1, 4:
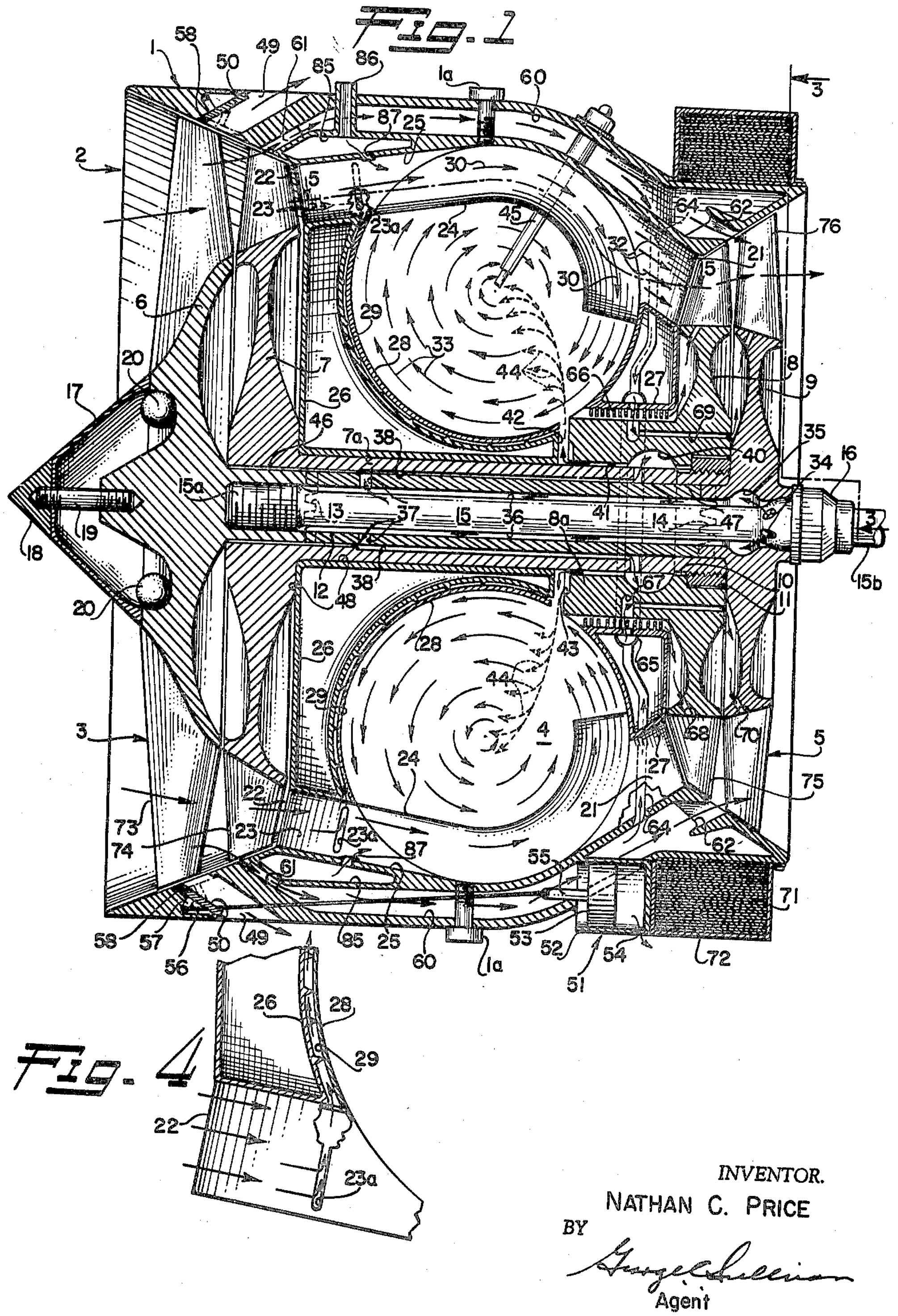
FIGURE 1 is a partial cross-sectional view in elevation axially along the vertical center line of a turbo-jet powerplant assembly of one embodiment of this invention.
FIGURE 4 is a view showing the enlarged details of the combustion chamber cooling airflow passages from the main airflow passage to the combustion chamber.
Figure 2:
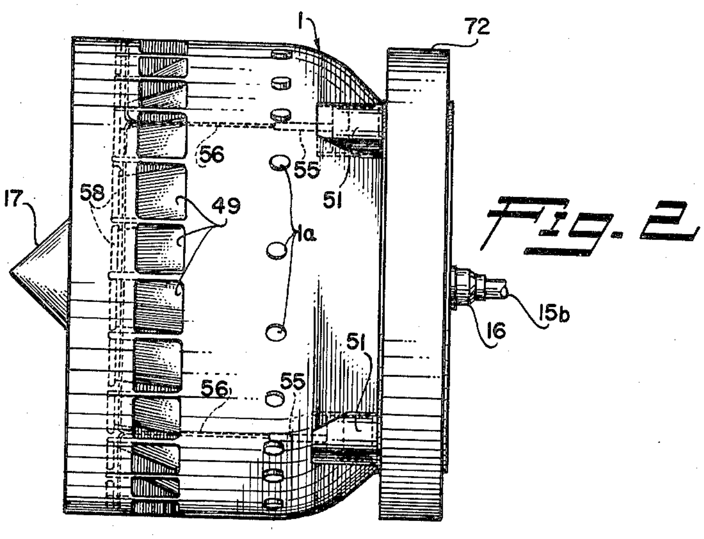
FIGURE 2 is an external view of the overall assembly of the powerplant unit of FIGURE 1.
Figure 3:
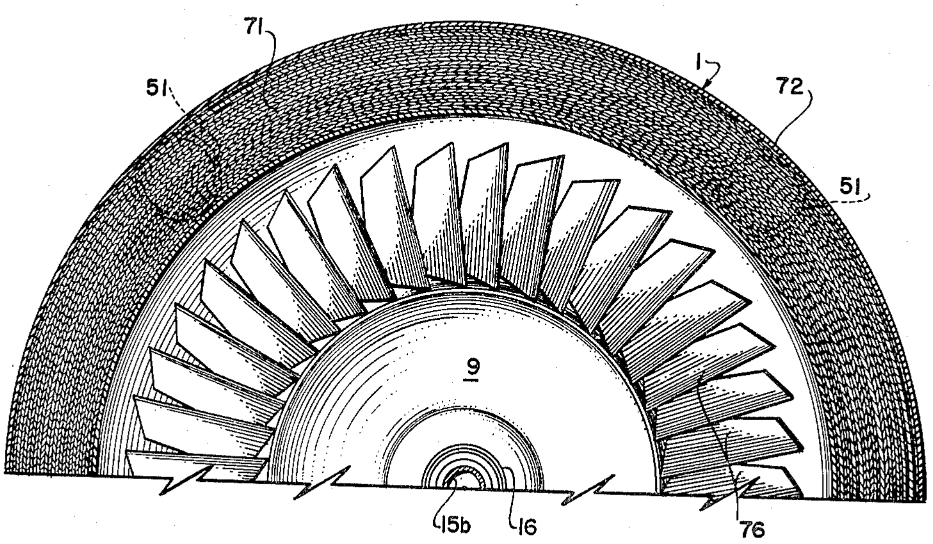
FIGURE 3 is a view taken along line 3—3 of FIGURE 1.

Generally stated, the invention comprises a turbo-jet construction of four bladed wheel discs with two discs in the compressor having supersonic blading and two turbine discs, the discs being interconnected whereby the compressor first stage and turbine second stage rotate as a unit in one direction and the compressor second stage and turbine first stage rotate as a unit in a counter direction. There are only two stator stages used in the assembly, one being downstream of the compressor second stage and the other being upstream of the turbine first stage. Thus, there are no stator blades or nozzle vanes intermediate the compressor and turbine rotor stages respectively.

A toroidal vortex combustor is utilized which results in a substantial reduction in the axial length of the combustion chamber than has been practiced heretofore. Although relatively high combustion temperatures are utilized in the powerplant, sufficient cooling of the powerplant is accomplished by a combustion of air and fuel flows.

Fuel is delivered to the combustion chamber by centrifugal force at the turbine shaft side of the combustor through hollow turbine shafts.

Airflow conditions through the powerplant are controlled by bypass and dump out or bleed devices so arranged as to effectively prevent or remove any boundary layer build-up in the compressor section.

Referring more specifically to FIGURES 1 through 5, the powerplant comprises an outer casing assembly 1 having an annular flow path for air through inlet 2, compressor section 3, combustion chamber 4 and turbine 5. As can be seen more specifically in FIGURE 1, the compressor section 3 comprises first and second compressor stage discs indicated as 6 and 7 respectively, each of which are respectively connected to one of the turbine discs 8 and 9 in such a manner that compressor disc 7 is connected to the first stage turbine disc 8 and first stage compressor disc 6 is interconnected to the second stage turbine disc 9. The second stage compressor disc 7 has an axially extending integral hollow shaft 7*a* extending aft of the main disc portion 7 while the first stage turbine disc 8 has an integral hollow shaft portion 8*a* extending forward of the main disc portion 8. The first stage turbine disc 8 and shaft 7*a* are joined by spline connection 10 located at the aft end of hollow shaft 7*a*, and held together by nut 11 mounted on threads located at the end of shaft 7*a*.

The first stage compressor disc 6 is connected to the second stage turbine disc 9 through a hollow torque shaft 12 extending axially within the integral hollow shafts 7*a* and 8*a*, curvic couplings 13 and 14 serve as the driving engagements between the shaft 12 and first stage compressor disc 6 and second stage turbine disc 9 respectively. A cap screw 15 is threadedly engaged to the first stage compressor disc 6 at 15*a* and extends axially through hollow torque shaft 12 and turbine disc 9 with a nut 16 mounted thereon on the opposite side of second stage turbine disc 9 thereby securing compressor disc 6, shaft 12 and turbine disc 9 in assembly by axial compression.

A hollow spinner 17 is mounted to the forward side of compressor disc 6 by a nut 18 mounted on a threaded stud 19, the stud 19 extending through the forward wall of spinner 17 and threadingly connected to a tapped hole in the hub of compressor disc 6. A plurality of balance balls 20 are located within spinner 17 to maintain balance of the cantilevered wheel 6 by arranging themselves arcuately within the hollow space to dampen out any vibrations from unbalance during operation.

Within outer casing 1 is a segmented inner casing structure 25 containing a plurality of turbine nozzle guide vanes 21 at the aft end thereof or just immediately upstream of the first stage turbine. At the forward end of the inner casing structure 25 are arranged a plurality of combustion chamber inlet guide vanes 22 forming diffuser passages 23 therebetween receiving the compressed air discharged from the compressor second stage, as can best be seen in FIGURE 5. The combustion chamber inlet guide vanes 22 are connected at their trailing edges to a plurality of vane assemblies 24 which extend aftwardly and radially inwardly to direct a substantial portion of the compressed air into the toroidal combustion chamber 4. The segments 25, vane assemblies 24, turbine nozzle guide vanes 21 and combustion chamber inlet guide vanes 22 are mounted within outer casing 1 by bolts 1*a* extending through outer casing 1 into threaded engagement with segments 25 as can best be seen in FIGURE 1. The radially inner ends of combustion chamber inlet guide vanes 22 being secured to a substantially L-shaped hollow structural member 26 whose radial innermost surface acts as a bearing for the hollow shaft portion 7*a* of second stage compressor disc 7. The radial inner ends of turbine nozzle guide vanes 21 are secured to an annular hollow member 27. A combustion chamber liner 28 is mounted by any appropriate means or manner to an outer surface of structural member 26 in such a manner to provide a cooling airflow gap 29 between structural member 26 and liner 28, as can best be seen in FIGURE 4.

Figure 5:
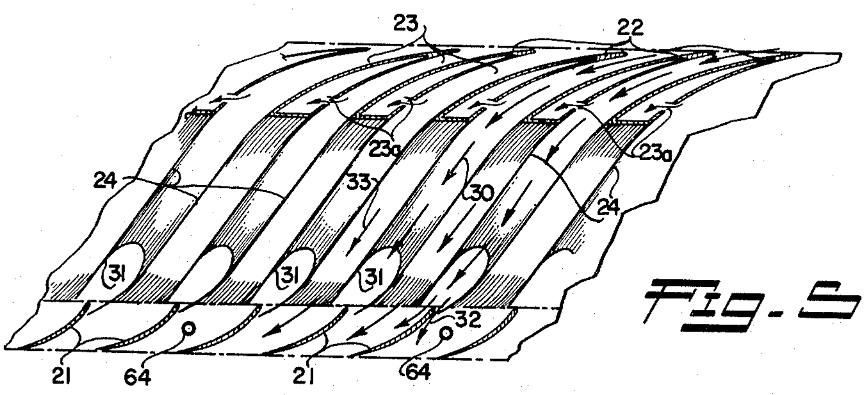
FIGURE 5 is a view taken along line 5—5 of FIGURE 1.

The airflow into and through combustion chamber 4 is such that the compressed air discharging from the compressor is directed by the combustion chamber inlet guide vanes 22 into diffuser passages 23 as indicated by flow arrows 30 in FIGURES 1 and 5. A small portion of the air passes through slots 23*a* in the side walls of combustion chamber inlet guide vanes 22 to pass beneath the combustion chamber liner 28 through cooling air passage 29 for cooling of liner 28 and subsequent entry into combustion chamber 4. A majority of the compressor discharge air passes downwardly through radial extending passages 31 into the torous combustion chamber 4 and the balance of the compressor discharge air flows through the diffuser passages 23 passing on both sides of a turbine nozzle guide vane 21 as indicated by flow arrows 32 in FIGURES 1 and 5. The compressor discharge air passing directly around turbine nozzle vanes 21 is only partially diffused, but still energetic, and mixes with the hot combustion gases coming from the combustion chamber before passing into the turbine. The compressor discharge air entering combustion chamber 4 is more completely diffused than that portion of the compressor discharge passing directly to turbine inlet guide vanes 21, and the kinetic energy of this air is established in the combustion chamber vortex. The flow within combustion chamber 4 is a "smoke ring" vortex and avoids the necessity of flameholders as indicated by flow arrows 33 in FIGURES 1 and 5 before passing through the turbine nozzle passages between adjacent guide vanes 21 as can be most clearly seen in FIGURE 5 into the first stage of turbine 5. The fuel-rich center of the vortex maintains a flame throughout the entire load range. Also, a secondary vorticity occurs about the turbo-jet axis. Kinetic energy losses of the flow system are less than those of conventional combustion chambers and the rate of heat liberation per volume of combustion chamber is greater. The amount of excess air in the combustion chamber 4 is established at a value most favorable to a high rate of heat release and the combustion is more complete whereby the volume within the powerplant required for excess air is less, making the turbo-jet more compact.

Fuel delivery to the powerplant is through a hollow portion 15*b* of cap screw 15, which is connected to any appropriate fuel source (not shown). The fuel passes through radial openings 34 in cap screw 15 into an annular chamber formed between groove 35 in turbine disc 9 and the outer surface of cap screw 15. Due to the centrifugal force pumping fuel through the radial passages 34 the fuel then flows forward through annular passage 36 between the outer surface of cap screw 15 and the inner surface of hollow shaft 12 to radial extending openings or passages 37 through hollow shaft 12 by centrifugal force into another annular chamber 38 located between the outer surface of hollow tube 12 and the inner surface of hollow shaft 7*a*. The fuel passes from annular passage 38 into a chamber formed between the outer surface of hollow shaft 7*a* and the inner surface of hollow shaft 8*a* by an annular groove 40 on the inner surface of hollow shaft 8*a*. A still further annular passage 41 is formed between the outer surface of hollow shaft 7*a* and the inner surface of hollow shaft 8*a* through which the fuel passes in a forward direction through a radially extending annular passage 42 formed between the aft surface of structural member 26 and the forward surface of hollow shaft 8*a*. While there is substantial pumping action through the fuel path from the hollow portion of cap screw 15*b* to the radially extending annular passage 42 into the combustion chamber through centrifugal force, additional pumping action may be secured by providing appropriate pumping type vanes 43 on the forward face of hollow shaft 8*a*. Because of the fuel pressure developed through centrifugal force pumping the fuel through radial passages 34, 37, 39 and 42, and pumping vanes 43, a substantial fuel pressure is accomplished whereby the discharge of the fuel into combustion chamber 4 mixes with the compressed air flowing as indicated by arrows 30, the path of the fuel as indicated by broken arrows 44 in FIGURE 1.

Combustion is initiated and maintained by any appropriate ignition means 45 extending into combustion chamber 4.

The bearing arrangements for the two contra-rotating shafts and the relative rotation of the outer shaft relative to the casing or support structure are of the journal type, and in view of the extent of temperatures during operation, may be comprised of porous chromium plating on the confronting surface portions of the outer surface of hollow shaft 12 and the axial extension of disc 6 confronting with the inner surface of hollow shaft 7*a* as indicated at 46, and the confronting portions of the axial extremity of hollow shaft 7*a* confronting with the outer surface of hollow shaft 12 and the outer surface of the axially extending hub of turbine disc 9 as indicated by 47. The same arrangement is provided between the confronting portions of the inner surfaces of members 26 and the outer surface of hollow shaft 7*a*, this last bearing arrangement also extending over to the front face of members 26 and the aft face of disc 7, as indicated by 48. The pores of the bearing surfaces are treated with any suitable dry lubricant. Also, extending the porous bearing surfaces into the fuel flow chambers and passages permits the passage of fuel through the pores to serve as a bearing lubricant, the lubricanting supply thus coming from the fuel system and can dispense with a separate or independent lubricating oil system.

The airflow path through the powerplant begins with ingestion of air into inlet 2 during operation which is compressed by compressor section 3. A boundary build-up along the casing wall adjacent the tips of the blading of disc 6 is prevented by providing a plurality of spill gates 49 extending radially through the casing, the openings of which are governed by valves 50 in turn controlled by a plurality of pneumatic servo-controls 51 located around the periphery of outer casing 1 just forward of turbine section 5; the operation of controls 51 being explained hereinafter.

A bypass annulus 60 is provided between casing assembly 1 and inner casing segments 25 to also bypass air from the tips of the compressor second stage to the turbine second stage. A plurality of vanes 61 are provided at the inlet to annulus 60 and are constructed in such a nature as to provide a mixed flow diffuser during flow through the passages formed between adjacent vanes 61. The discharge from annulus 60 is through a nozzle ring into the turbine second stage formed by a plurality of nozzle guide vanes 62. Vanes 61 and 62 provide the proper spacing between outer casing 1 and inner casing segments 25.

Cooling air for the combustion chamber 4 is supplied from the compressor discharge air through radial extending bleed passages or slots 23*a* located on one side of each inlet guide vane 22, as can best be seen in FIGURES 1, 4 and 5. The cooling air passing through slot 23*a* is conducted into the cooling airflow gap 29 between structural member 26 and the combustion chamber liner 28. This combustion chamber cooling airflow then continues its flow between member 26 and liner 28 through the gap 29 to the other end of gap 29 and enters the combustion chamber 4 at the fuel inlet annular slot.

Turbine cooling air is received from the bypass air in annulus 60 through radial extending tubes 64 into an annulus 65. The cooling air from annulus 65 passes through a plurality of holes or openings on the radially inner side of the annulus where it will pass axially fore and aft through labyrinth 66 and radially inward to an annular groove 67 located circumferentially around the outer surface of portion 8*a* of turbine disc 8. The cooling air flowing forward across labyrinth 66 is aspirated into the combustion chamber 4 and serves to cool the outer forward portion of portion 8*a* of turbine disc 8. The air flowing aft across labyrinth 66 cools the aft circumferenrce of portion 8*a* of turbine disc 8 and the forward face of turbine disc 8 and flows through passages or holes 68 in the rim of turbine disc 8, the airflow into opening 68 being described and explained in more detail hereinafter. The cooling air from annular groove 67 exits therefrom through a plurality of axially extending passages or holes 69 into the space between the aft face of turbine disc 8 and the forward face of turbine disc 9. This cooling airflow passes from this chamber through a plurality of passages or holes 70 in the rim of the second stage turbine disc 9, similar to the cooling airflow through passages 68 and which in turn will also be described in more detail hereinafter.

The preferred embodiment of pneumatic servo-control 51 comprises a housing or cylinder 52 that is partially embedded within the outer surface of casing 1, with a piston 53 therein. One side of piston 53 forms a moving wall of a variable volume chamber vented to the ambient or surrounding air external of control 51 through orifice 54. Piston rod 55 extends from the opposite side of piston 53 into bypass annulus 60 and is connected at its end to a linkage 56, which in turn is connected to a plurality of lever arms 57, each forming a part of valve 50. Valve 50 and lever 57 are fixed relative to each other and rotate about pivot axis 58, the fixed relation between lever 57 and valve 50 being such that when valve 50 is fully closed by retraction of linkage 56 towards control 51, the pivotal connection of linkage 56 and lever 57 is always below the pivot axis 58 as viewed in the lower portion of FIGURE 1.

Control 51 is arranged in such manner that the upstream side of piston 53 is exposed or subjected to the airflow through annular bypass 60 whereby actuation or control of valves 50 is effected by positioning of piston 53 by the airflow conditions through the powerplant. At low fuel flow and low r.p.m. the pressure developed in annular bypass 60 is low because of undeveloped shock conditions, and hence pressures, in the second stage compressor blading. This low pressure in bypass 60 exerts little, if any, force on the forward walls of pistons 53 and the valves 50 are blown open by the pressure of the air at the first stage compressor blade tips, thereby spilling outside casing 1 through spill gates 49. As the r.p.m. increases, the pressure developed in annular bypass 60 rises more rapidly than the air pressure spilling out of gates 49, and hence, the increased pressure of bypass 60 reacts on the forward walls of pistons 53 to reposition them which in turn moves valves 50 to a more closed position. At a high r.p.m. the second stage compressor becomes fully shock-developed with a resulting high enough pressure in annular bypass 60 that pistons 53 have enough force exerted on them to completely close valves 50 so that there is no air spillage through gate 49.

The compressor air spill and bypass systems cooperate very effectively to correctly maintain the flow continuity, blading impingement angles and stage matching at off-design performance conditions, as well as to accomplish production of some power in the turbine by the bypass air. Additionally, the casing boundary layer growth or flow reversal is prevented by removal of the boundary layer air and surging or choking does not occur during rapid load changes.

The axial extent of the casing assembly 1 through turbine section 5 is armored by a coil of steel 71, such as a soft stainless steel strip of approximately .050 inch in thickness contained within a sheet metal housing 72. The coil 71 is wound tightly and the surfaces may be graphited if desirable to allow more energy to be absorbed by the coil 71 in the event of turbine discs or bucket failures.

Axial thrusts of the rotor system are balanced by a combination of pneumatic and hydraulic means rather than by thrust bearing surfaces. The rotor spools are urged forward in the direction of the turbo-jet air inlet by the net aerodynamic forces developed and it is necessary to oppose these net forces by equal forces acting on the rotor spools in the opposite direction, or the direction of jet discharge. The balance force of the high-pressure spool, or compressor second stage and turbine first stage, is obtained by the fuel pressure centrifugally developed in annular groove 40 directly upstream of the circumferential fuel delivery slot or passage 42 in the fuel delivery system. This fuel pressure in groove 40 is very high resulting in the high-pressure spools forward thrust floating on the fuel pressure in groove or cavity 40.

Balance force for the low pressure spool, or compressor first stage and turbine second stage, relative to the high pressure spool is obtained in the space between the two turbine discs 8 and 9, into which the second stage turbine bucket cooling air flows at a substantial excess pressure. The confronting edges of rims of turbine discs 8 and 9 are arranged or formed to trap this pressure to the required degree by close running tolerancs. As an alternate, or if need be, a mating step can be furnished at the confronting edges of the disc rims to trap the air pressure.

Figures 6, 7, 8, 9, 10, 11, 12, 13, 15:
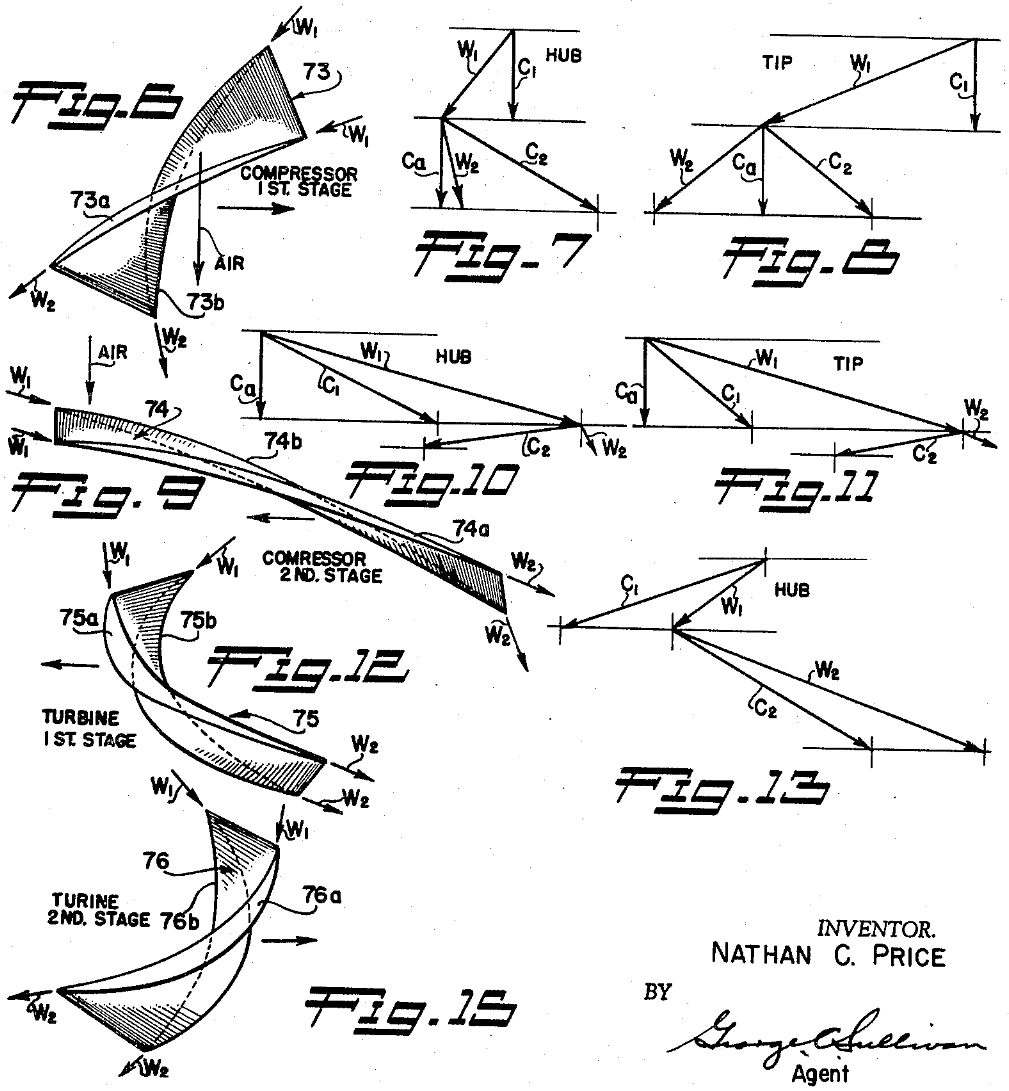
FIGURE 6 is a plan view of the blading in the first compressor stage.
FIGURES 7 and 8 show the velocity diagrams of the blading hubs and tips of the first stage compressor blading shown in FIGURE 6.
FIGURE 9 is a plan view similar to FIGURE 6 showing the second stage compressor blading of the powerplant shown in FIGURE 1.
FIGURES 10 and 11 show the velocity diagrams at the hubs and tips of the second stage compressor blading shown in FIGURE 9.
FIGURE 12 shows the first stage turbine buckets in plan view.
FIGURES 13 and 14 show the velocity diagrams at the hubs and tips of the first stage turbine buckets shown in FIGURE 12.
FIGURE 15 shows the second stage turbine buckets in plan view.

The first stage compressor blading comprises vanes 73, as can best be seen in FIGURE 6, of thin, slightly cambered laminar-flow airfoils at the tip 73*a*, and thick, greatly cambered laminar-flow airfoils at the hub 73*b*. The vanes 73 have sharp leading edges and are spaced around disc 6 as closely as clearance at the front of the hub permits.

The hub/tip diameter ratio entering the first stage compressor is relatively small to admit the largest airflow possible. The rims of both compressor discs 6 and 7 flare steeply outward to accelerate boundary layer air and to implement meeting the requirements of flow continuity. Air compression is large and in a short axial length so that the compressor casing bore must converge at a relatively large angle to satisfy flow continuity. This conicity might produce a thick boundary layer or flow reversal except that the in and out relative velocities at the blade tips of both stages are almost in line because bypass passages are furnished in the casing confronting the blade tips.

The second stage compressor vanes 74 resemble thin, uncambered laminar-flow airfoils at the tip 74*a*, and less thin, definitely cambered laminar-flow airfoils at the hub 74*b*. The leading edges of vanes 74 are sharp and relatively close blade spacing is employed.

The blading is of a supersonic type inasmuch as the largest amount of air that can be ingested can be accomplished by supersonic blading thereby producing the most jet thrust. The throat required for conversion of the supersonic inlet velocity to subsonic exit velocity through the stages is provided in each compressor stage by the vane thickness combined with the compressor profile. In this manner a number of weak shocks are generated in the vane rows resulting in a compressor efficiency of approximately 90% at design airflow conditions.

To maintain a constant, or nearly constant, axial velocity, what is known as free-vortex blading must be utilized to compensate for or correct the variance in the linear velocity of the hub and tip portions of the vanes of each stage at any r.p.m. By camber change and twist along the radial extent of the vanes such linear velocity variance can be compensated for as shown in FIGURES 7 and 8, which represent the vector diagrams of the hub and tip respectively of vanes 73. Vector $C_1$ of FIGURE 7 represents the axial component of compressible fluid velocity at the leading edges of the first stage compressor vanes 73 at the hub, with vector $W_1$ representing the relative velocity of the axially moving fluid and the rotating vanes. Vector $C_2$ represents the actual velocity and direction of the fluid from the trailing edge of vanes 73 while vector $W_2$ represents the relative velocity and direction of the fluid from the trailing edge of vanes 73. FIGURE 8 represents the same vectors as shown in FIGURE 7 except these vectors represent conditions at the tip of vanes 73. While the inlet velocities $C_1$ are identical at both the hub and tip, the relative velocity $W_1$ at the tip, as shown in FIGURE 8, is much larger than that at the hub due to a larger linear velocity of the vane tip than the vane hub. Likewise, due to the changes in vane camber and twist, while the actual velocity $C_2$ at the hub, as shown in FIGURE 7, is larger than that at the tip, the axial components $C_a$ of the actual velocity vectors $C_2$ are identical so that there is a constant axial velocity of the fluid leaving the trailing edge of vane 73 throughout its complete radial extent.

The vector diagrams for the hub and tip portions of the second stage compressor vanes 74 are shown in FIGURES 10 and 11 respectively. Vectors $C_1$ of FIGURE 10 and 11 represent the actual velocity and direction of the fluid at the leading edges of vane 74 and are identical with vectors $C_2$ of FIGURES 7 and 8 since there are no stator vanes between the rotor vanes 73 and 74. The axial velocity, as represented by vector $C_a$ in FIGURE 10 and 11 is also of the same magnitude as the vectors $C_a$ in FIGURES 7 and 8.

The vectors $C_2$ in FIGURES 10 and 11 represent the actual velocity and direction of the fluid past the trailing edges of vanes 74 and are directed toward the concave sides or surfaces of combustion chamber inlet guide vanes 22. This provides an efficient and productive angle of fluid flow relative to the guide vanes 22 by providing a positive angle of attack of fluid flow on the concave side of guide vanes 22. This, coupled with the reduction of axial velocity past the trailing edge of vanes 74 due to the fluid compression in the passage formed between adjacent vanes 74, results in good diffusion of the fluid in diffuser passages 23 for conversion of the fluid kinetic energy to static pressure.

The first compressor stage blading 73 delivers the second compressor stage blading 74 a fully developed vortex flow and converts the inlet flow depression in the axial velocity to a positive pressure with a first stage energy input in B.t.u./pound of air of approximately 30% of the total energy input of the compressor. At the same tip velocity the second stage compressor blading 74 delivers the remaining 70% of total energy input of the compressor to the fluid flow. Consequently, the first stage turbine must absorb approximately 70% of the total energy extracted from the fluid flow by the turbine, with the remaining 30% absorbed by the second stage turbine, tip velocities of the two turbine stages being the same.

To accomplish this it will be necessary at some conditions of operation where a relatively high thrust/weight ratio is desired to operate with the relative velocity of the fluid at the exit of the first turbine stage to be supersonic. Other than this, the turbine relative velocities are very subsonic, permitting conventional bucket shapes. Referring to FIGURES 12 and 15, the first stage turbine buckets 75 are reaction shaped at the tip 75*a* and impulse shaped at the hub 75*b*, and the second stage turbine buckets 76 are likewise reaction shaped at the tip 76*a* and impulse shaped at the hub 76*b*; such shaping meeting the requirements of free vortex flow theory. Also, as can be seen in FIGURE 1, the turbine casing is very conical to maintain good hub/tip diameter ratios of the wheels or discs 8 and 9 of turbine 5.

Figure 14:
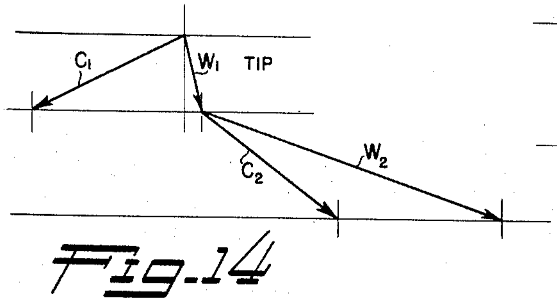

FIGURES 13 and 14 represent the vector diagrams of gas flow at the hub and tip respectively of first stage turbine buckets 75. Vectors $W_1$ of FIGURES 13 and 14 represent the velocity and direction of the gas flow relative to the leading edge hub and tip portions respectively of turbine buckets 75, while vectors $C_1$ represent the actual gas velocities and directions. Vectors $W_2$ and $C_2$ of FIGURES 13 and 14 represent the gas velocities and direction relative to the trailing edge of the turbine buckets 75 and the actual velocities and directions of gas flow respectively; the figures pertaining to the hub and tip portions respectively of turbine buckets 75.

Figure 16:
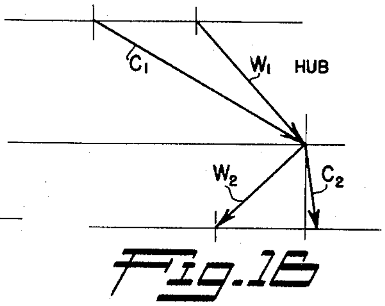
FIGURES 16 and 17 show the velocity diagrams at the hubs and tips of the second stage turbine buckets shown in FIGURE 15.
Figure 17:
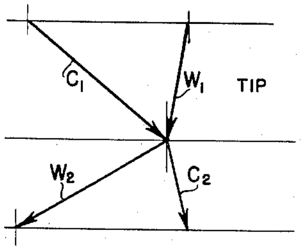

FIGURES 16 and 17 are similar to FIGURES 13 and 14 for showing the representative vector diagrams for turbine buckets 76, with vector $C_2$ of FIGURE 13 the same as vector $C_1$ of FIGURE 16, and vector $C_2$ of FIGURE 14 the same as vector $C_1$ of FIGURE 17.

Figure 18:
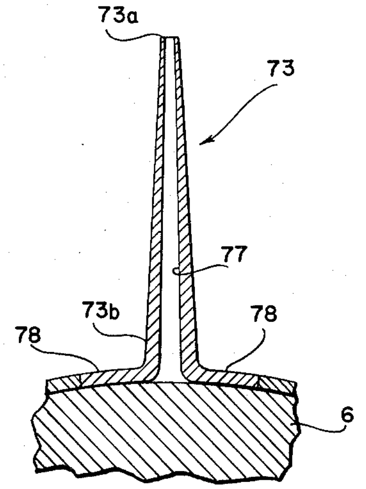
FIGURE 18 is a cross-sectional view showing the compressor blades attached to the compressor rotor disc.
Figure 19:
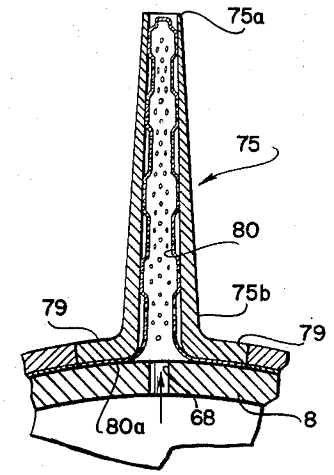
FIGURE 19 is a cross-sectional view showing the turbine buckets mounted to the turbine rotor disc.

The compressor vanes 73 and 74 and turbine buckets 75 and 76 of the embodiment of the invention presented herein may utilize a hollow construction shown in FIGURES 18 and 19. In FIGURE 18 the compressor vane 73 shown is formed from a tapered sheet of any appropriate high temperature metal or alloy, the sheet thickness at the base or hub 73*b* being about three times the sheet thickness at the tip 73*a*, the forming in such a way to provide a hollow interior 77. The blade hub is outwardly flared to form flanges 78 shaped to the rim of compressor disc 6. The blades 73 are joined to the rim of compressor disc 6 by electric resistance welding with a fusion area of at least twice the cross-sectional area of the sheet material at the hub.

Construction of turbine buckets 75 is shown in FIGURE 18 and it is to be understood that buckets 76 are of a similar structure. Turbine buckets 75 are made from a tapered sheet of an appropriate high temperature metal or alloy, the sheet thickness at hub 75*b* being about three times the sheet thickness at tip 75*a*. The bucket hub or base is also outwardly flared to form flanges 79 and shaped to the rim of turbine disc 8, the flanges 79 joined to the rim by electric resistance welding with a fusion area of at least two and one-half times the cross-sectional area of the sheet material at the base. Buckets 75 are internally air cooled by the flow of turbine cooling air flowing radially outward along the forward faces of turbine discs 8 and 9, as discussed above and which can best be seen in FIGURE 1, with a portion of this air passing radially into the interior of buckets 75 by passing through the radial openings or passages 68 through the rim of turbine disc 8. This cooling air is constrained to flow at a relatively high velocity along the inner surface of bucket 75 by a filler 80 within the hollow bucket. The filler 80 is constructed from a high temperature metal or alloy to the shape of the hollow bucket interior and is perforated and dimpled so that the cooling airflow passage can be held accurately to any desired gap between the interior bucket wall and filler 80. Filler 80 has an outwardly flanged base 80*a* electrically welded to the under side of the bucket flanges 79.

Turbine buckets 78 are of an identical construction as buckets 70, and receive their cooling air through passages 70 located in the rim of turbine disc 9.

Starting is accomplished by supplying high pressure air from any appropriate source (not shown) to an annular duct or chamber 85 located annularly in the inner casing, the air being supplied to chamber 85 through a conduit or pipe 86 extending radially through annular bypass 60 and outer casing 1. A small passage or nozzle 87 points downstream into each diffuser passage 23 formed between adjacent inlet guide vanes 22 so that when high pressure air is supplied to chamber 85 a jet pump action is created in each diffuser passage 23. This jet pump action draws air through the inlet 2 and compressor blading and forces the total flow through the turbine blading. A small flow of fuel is immediately pumped through hollow portion 15*b* of capscrew 15 to lubricate bearings and permit immediate ignition to lessen the required amount of starting air to accelerate the rotor to idling speed.

In operation, once the rotor is brought up to idling speed, the high presesure starting air can be shut off and the unit accelerates in r.p.m. without surging or choking as the spill gates 49 are open until closed by the appropriate airflow conditions through the powerplant and bypass annulus 60. During this time lubrication of the bearings takes place by the fuel flow, as well as the fuel flow and air flow provide the necessary cooling and thrust balancing.

As can be seen and understood by reading the foregoing in conjunction with the drawings, I provide a small, compact and efficient powerplant with a high thrust/weight ratio. While a particular embodiment of the invention has been illustrated and described, it will be obvious to those skilled in the art that various changes and modifications may be made without departure from the invention and it is intended to cover in the appended claims all such modifications and equivalents as fall within the true spirit and scope of this invention.

What is claimed is:

1. A turbo-jet powerplant comprising; a compressor rotor section, a turbine rotor section having a hollow hub and shaft portion, a combustor located between said compressor and turbine rotor sections, means drivingly connecting said turbine section to said compressor section including a member extending axially through said hollow portion, a portion of said member having a diameter less than the inner diameter of the hollow portion to provide a first axially extending annular passage between the member outer surface and hollow portion inner surface, an annular chamber within the turbine rotor section located radially outside said first annular passage, a second annular passage extending axially from said chamber to a rotating annular surface on the turbine rotor section, a fixed annular surface forming a part of the combustor and spaced from said rotating annular surface in confrontation providing a radial extending slot therebetween, and fuel inlet means providing passage for fuel into said first annular passage for passage therethrough and delivery into the combustor through the annular chamber, second annular passage and radial slot by centrifugal force during operation of the powerplant.

2. A turbo-jet powerplant as claimed in claim 1 wherein said rotating annular surface includes pumping type vanes thereon for increased fuel delivery pressure into the combustor through the radial slot.

3. A turbo-jet powerplant comprising; a compressor rotor section, a combustion section, a turbine rotor section having a hollow hub and shaft portion in alignment, means drivingly connecting said turbine section to said compressor section, said combustor section formed by an internal structure located between the compressor rotor and turbine rotor sections arcuately shaped around the powerplant axis at the inner radial surface to provide bearing surfaces for the compressor-turbine connecting shaft portion, said confronting surfaces of both the shaft means and the internal structure being porously plated, said means drivingly connecting said turbine section to said compressor section including a member extending axially through said hollow portion, a portion of said member having a diameter less than the inner diameter of the hollow portion to provide a first axially extending annular passage between the member outer surface and hollow portion inner surface, an annular chamber within the turbine rotor section located radially outside such first annular passage, a second annular passage extending axially from said chamber to a rotating annular surface on the turbine rotor section, fixed annular surface forming a part of the combustor and spaced from said rotating annular surface in confrontation providing a radial extending slot therebetween, and fuel inlet means providing passage for fuel into said first annular passage for passage therethrough and delivery into the combustor through the annular chamber, second annular passage and radial slot by centrifugal force during operation of the powerplant as well as delivery to said bearing porous plating for lubrication between the rotating shaft and the stationary structure whereby the powerplant fuel supply system serves to both power and lubricate the powerplant.

4. A turbo-jet powerplant comprising; a compressor rotor section, a turbine rotor section having a hollow hub and shaft portion, a combustor located between said compressor and turbine rotor sections, means drivingly connecting said turbine section to said compressor section including a member extending axially through said hollow portion, a portion of said member having a diameter less than the inner diameter of the hollow portion to provide a first axially extending annular passage between the member outer surface and hollow portion inner surface, an annular chamber within the turbine rotor section located radially outside said first annular passage, a second annular passage extending axially from said chamber to a rotating annular surface on the turbine rotor section, a fixed annular surface forming a part of the combustor and spaced from said rotating annular surface in confrontation providing a radial extending slot therebetween, fuel inlet means providing passage for fuel into said first annular passage for passage therethrough and delivery into the combustor through the annular chamber, second annular passage and radial slot by centrifugal force during operation of the powerplant, means conducting air from the compressor to the outer surface of the turbine section hollow hub and shaft, and guide means directing said air from the proximity of the turbine hollow hub and shaft to flow in a radially outward direction along the faces of the turbine rotor section whereby said airflow and fuel flow combine in cooling said turbine section, the fuel cooling the radial inner portion and the air cooling the radially outer portion.

5. A turbo-jet powerplant comprising; a compressor rotor section, a turbine rotor section having a hollow hub and shaft portion, a combustor located between said compressor and turbine rotor sections, means drivingly connecting said turbine section to said compressor section including a member extending axially through said hollow portion, a portion of said member having a diameter less than the inner diameter of the hollow portion to provide a first axially extending annular passage between the member outer surface and hollow portion inner surface, an annular chamber within the turbine rotor section located radially outside said first annular passage, a second annular passage extending axially from said chamber to a rotating annular surface on the turbine rotor section, a fixed annular surface forming a part of the combustor and spaced from said rotating annular surface in confrontation providing a radial extending slot therebetween, fuel inlet means providing passage for fuel into said first annular passage for passage therethrough and delivery into the combustor through the annular chamber, second annular passage and radial slot by centrifugal force during operation of the powerplant, a bypass annulus extending from adjacent vane tips of a compressor stage conducting air directly from the compressor to the turbine to bypass the powerplant combustion section, means conducting bypass air from the bypass annulus to the outer surface of the turbine section hollow hub and shaft, and guide means directing said air from the proximity of the turbine hollow hub and shaft to flow in a radial outward direction along the bases of the turbine rotor section whereby said airflow and fuel flow combine in cooling said turbine rotor section, the fuel cooling the radially inner portion and the air cooling the radially outer portion.

References Cited by the Examiner

UNITED STATES PATENTS

| | | | |
|---|---|---|---|
| 2,861,425 | 11/1958 | Williams | 60—39.74 |
| 3,021,675 | 2/1962 | Schroeder | 60—39.74 |
| 3,124,933 | 3/1964 | Stram | 60—39.74 X |

MARK NEWMAN, *Primary Examiner.*